United States Patent [19]
Cottrell et al.

[11] Patent Number: 5,314,275
[45] Date of Patent: May 24, 1994

[54] SAFETY TIE-DOWN ROLLER

[75] Inventors: D. Michael Cottrell; Don J. Cottrell, both of Gainesville, Ga.

[73] Assignee: Cottrell, Inc., Gainesville, Ga.

[21] Appl. No.: 874,395

[22] Filed: Apr. 27, 1992

[51] Int. Cl.$^5$ .............................................. B60P 3/079
[52] U.S. Cl. ........................................ 410/26; 410/12; 410/103
[58] Field of Search ...................... 410/11, 12, 26, 100, 410/102, 103

[56] References Cited

U.S. PATENT DOCUMENTS

| | | | |
|---|---|---|---|
| 3,157,133 | 11/1964 | Wojcikowski | 410/12 |
| 3,187,686 | 6/1965 | De Podesta | 410/12 |
| 3,589,304 | 6/1971 | Haynes | 410/12 |
| 3,827,662 | 8/1974 | Krokos | 410/12 |
| 3,860,263 | 1/1975 | Taylor | 410/12 |
| 4,234,166 | 11/1980 | Cederblad | 410/103 |
| 4,273,484 | 6/1981 | Blanar | 410/12 |
| 4,273,486 | 6/1981 | Tatina | 410/12 |
| 5,145,299 | 9/1992 | Stephenson, Jr. | 410/100 |
| 5,156,506 | 10/1992 | Bailey | 410/100 |
| 5,180,262 | 1/1993 | Westerdale | 410/12 |

Primary Examiner—Michael S. Huppert
Assistant Examiner—Gregory A. Morse
Attorney, Agent, or Firm—James A. Hinkle

[57] ABSTRACT

A safety tie-down roller (1) has a spring laden ratchet pawl (9) positioned at an opposite side of structural framework (11) from a ratchet gear (8) and its related working conditions. A handle (33, 34, 35) is provided to release the ratchet pawl (9) against pressure of a spring (20, 37, 40, 42) for unloading cars and for straightening out chain to prevent loosening hazards. A wrench socket (45, 46, 51) is provided in addition to bar wrench apertures (15) for fast ratchet wrench rotation or optionally for motorized wrench rotation of the tie-down ratchet gear (8). Accurate torque control is made possible by the wrench sockets with either a hand torque wrench or a motorized torque wrench. Adapter plates (47, 49) are provided in addition to convenient forms of special hand wrenches (57, 58, 60). A non-lubricated hard bearing (26-29) for a tie-down rod (7) is attachable to car ramp structural members (12) of carrier vehicles (3, 4) without adversely affecting metal temper or causing distortion hard bearing surfaces (26, 27) from welding heat.

15 Claims, 7 Drawing Sheets

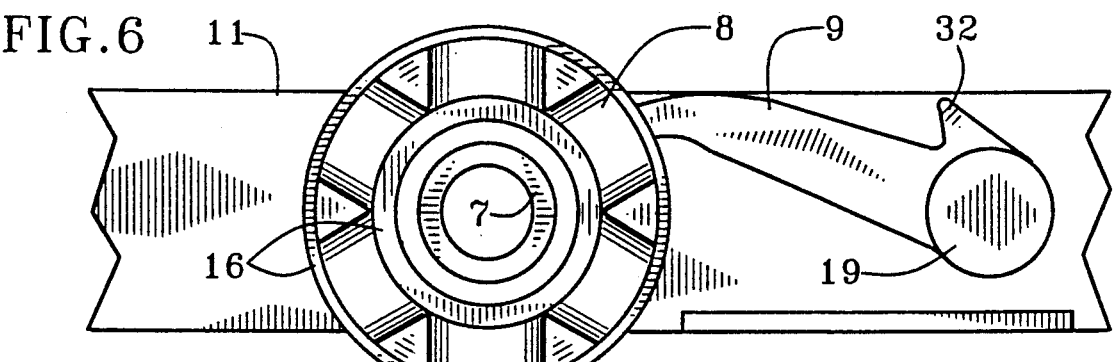
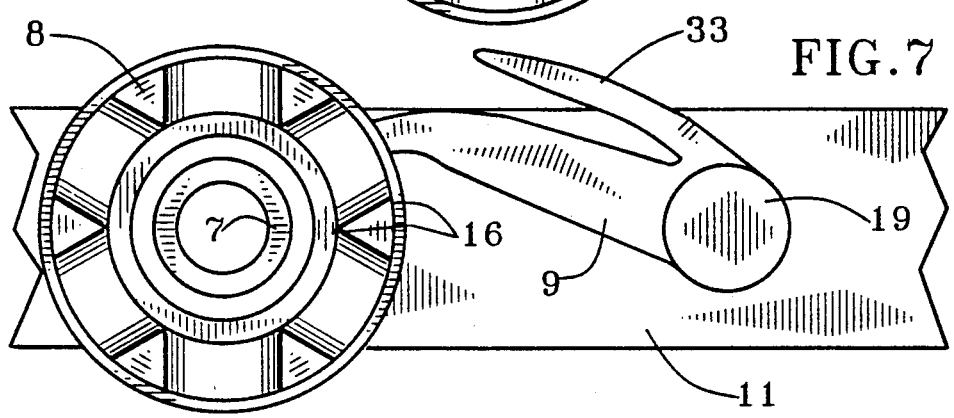

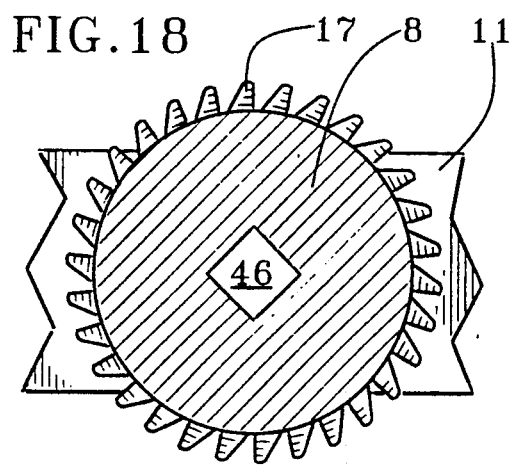
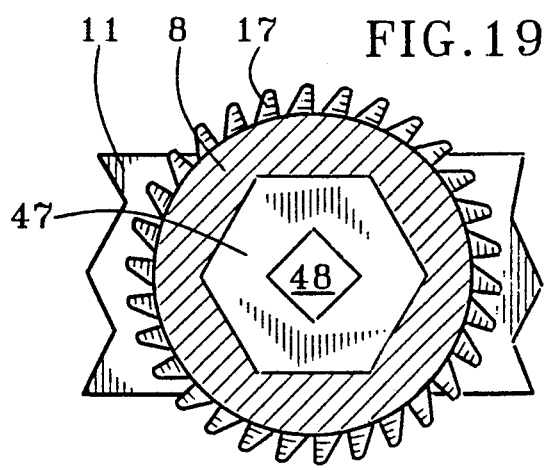
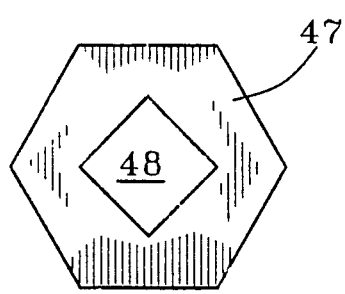
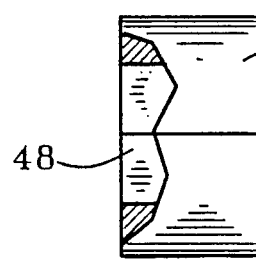
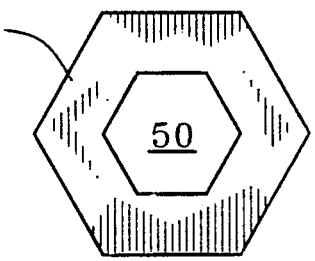
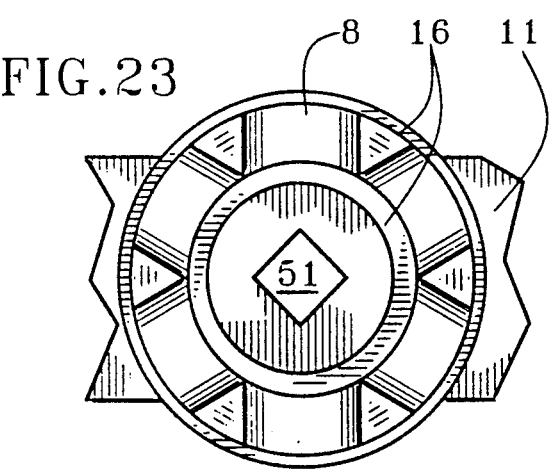
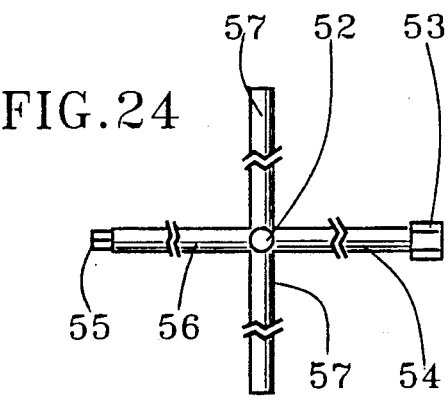
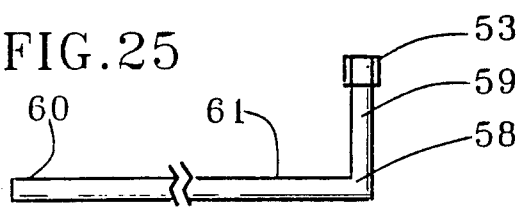
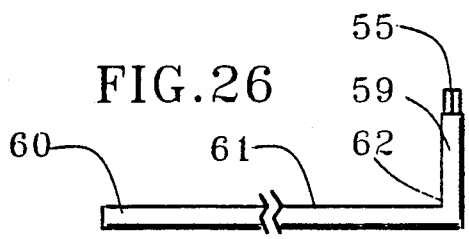

SAFETY TIE-DOWN ROLLER

BACKGROUND OF THE INVENTION

I. Field of the Invention

The present invention relates generally to the field of tie-down rollers for car carrier trucks and trailers. In particular, it relates to preventing a tie-down roller from disengaging or dislodging and allowing cars being carried to impact against each other, to impact against structural members of car carriers or to fall off of carriers. It provides safety against damage to cars from over tightening tie-down chains. It also protects against wear that weakens tie-down rollers and causes structural hazards.

II. Description of the Prior Art.

Tie-down rollers are a form of a manual winch for winding a tie-down chain tightly to hold cars on car carrier trucks and trailers. There is a tie-down roller at each car wheel portion of hydraulically positional wheel ramps. Typically, a tie-down roller has a tie-down bar that is provided with a dry bearing at each side of the ramp at a car wheel position. A tie-down chain is hooked to each of four corner tie-down brackets under a car and then wound around an inside end of each of four tie-down bars separately. The chain is wound by hand wrench rotation of the tie-down bar at an outside end of the tie-down bar. At the outside end of each tie-down bar where it can be reached from outside of the car carrier and from outside of each car being carried, there is a ratchet wheel with a pawl pivotally positioned to fall between ratchet teeth to prevent the tie-down chain from unwinding and becoming loose.

Too often, however, the tie-down chains "settle into" each other and for various other reasons lose tightness. Sometimes tightness is lost only momentarily and at other times progressively when cars being carried bounce due to particularly uneven or bumpy road conditions. When looseness occurs, the ratchet pawl can be disengaged totally and render a particular tie-down roller ineffective. Excessive tightening of the tie-down chain to prevent loosening can distort framework of cars in the vicinity of tie-down brackets. There are precautions to prevent such loosening without excessive tightening. One is to assure that all twisting is removed from a chain before it is tightened. But even the best and most cautious workers sometimes make mistakes that result in loosening of the tie-down chains.

A spring to hold the pawl in contact with the ratchet teeth has been tried previously. It worked, but not for long. It was broken and became dislodged soon because it was positioned where it came in contact with working conditions.

Short wrench handles have been tried to prevent over tightening of the tie-down chains. But different types of cars require different tightness and different individuals have different strength to rotate the tie-down bar with a wrench handle. Some individuals jump on the handles with their entire weight to rotate the tie-down bars. This is an inaccurate method because different individuals have different weight and ability to jump on the wrench handle. Obviously, too much tightening of the chains will result in distortion of the vehicle undercarriage with disastrous results.

Loose dry bearings are used generally for both ends of the tie-down bar. But wear occurs due to insufficient wear resistance of materials used. Soft bearings such as nylon were tried but quickly came off, leaving the mechanism in a hazardously wearing condition.

Another problem which has plagued the industry in the past, is the safety aspect of the operator having fingers and hands caught in the tie-down mechanism when it begins rapidly release the load attached to it. Obviously, the results will be a severe injury to the operator.

SUMMARY OF THE INVENTION

In accordance with the present invention, it is contemplated that one objective of this invention is to provide a pawl spring in a position where it can not be broken off easily around working conditions.

An object of the invention, in all of its forms, is to provide a positive lock which cannot come loose in transit and stays firmly engaged until the operator releases the locking mechanism.

Another objective is to provide a handle for disengaging the pawl against pressure of a pawl spring when releasing cars for removal.

Another objective is to provide a means for applying a select torque for rotating the tie-down ratchet according to requirements for different cars and tie-down conditions.

Another objective is to provide a durable socket for quick and easy ratchet wrench, cross wrench, L-wrench, bar wrench and power wrench rotation of the tie-down bar.

Another objective is to make car carrier modifications possible for convenient fast turn wrench access to tie-down ratchet gears from all ramp positions for winding and unwinding tie-down chains to eliminate chain twists and other chain loosening hazards.

Yet another objective is to provide a highly durable non-lubricated solid tie-down rod bearing which can be attached inexpensively without destroying wear characteristics of the bearing or weakening and deforming the framework of a car attached to the carrier.

One embodiment of the invention provides for a quick release pawl which releases tension of the tie-down rod when the operator inserts the handle through a handle ring and against the side of the pawl and then subsequently pressing the spring loaded pawl out of engagement with the ratchet, thereby freeing the tie-down rod. In this manner the hands of the operator are safely distanced from the moving working parts of the system and out of harm's way.

A second embodiment provides for an integral handle attached to the spring loaded pawl by which the operator may release the ratchet by exerting force on the handle and moving the pawl out of the ratchet, thereby freeing the tie-down rod. Not only is this embodiment extremely easy to operate, no separate handle is required for the release and the hands of the operator are, at all times, safely removed from danger.

This invention accomplishes the above and other objectives with a tie-down roller having a spring laden ratchet pawl positioned at an opposite side of structural framework from a ratchet gear and its related working conditions. A handle is provided to release the ratchet pawl against pressure of the spring for unwinding tie-down chain. A wrench socket is provided in addition to wrench rod apertures for fast ratchet wrench rotation, cross wrench spin rotation or optionally motorized wrench rotation of the tie-down ratchet for straightening out tie-down chain. Accurate torque control is made possible by the wrench socket with either a hand torque wrench or a motorized torque wrench. A non-lubricated hard bearing for a tie-down rod is attachable to car ramp structural members of carrier vehicles without adversely affecting metal temper or causing distortion from welding heat. Further, by design of tie-down roller, the vehicles being carried by the carriers are protected from over-tightening which can cause deformation to the undercarriage of the vehicle.

Other objects, advantages and capabilities of the invention will become apparent from the following description taken in conjunction with the accompanying drawings showing preferred embodiments of the invention.

BRIEF DESCRIPTION OF THE DRAWINGS

FIG. 6 is a sectional side view of this invention using a conventional pawl with a pawl spring not visible from the side;

FIG. 7 is a sectional side view of this invention using a pawl with a handle projecting from a central portion of the pawl and having a pawl spring not visible from the side;

FIG. 8 is a sectional side view of this invention with a pawl handle attached to the pawl and showing an orifice to a pawl spring;

FIG. 9 is a sectional side view of this invention with a pawl extended over ratchet teeth as a handle and having a pawl spring not visible from the side;

FIG. 18 is a sectional cutaway side view of a ratchet gear with a square wrench drive aperture;

FIG. 19 is a sectional cutaway side view of a ratchet gear with a square drive adapter plate in a hexagonal wrench orifice;

FIG. 20 is an end view of the adapter plate in FIG. 19 shown separately;

FIG. 21 is a cutaway side view of the FIG. 20 illustration;

FIG. 22 is an end view of a hexagonal drive adapter plate;

FIG. 23 is a sectional side view of a conventional rod wrench ratchet gear with a square drive wrench orifice;

FIG. 24 is a side view of a cross wrench having a hexagonal drive boss on one arm, a square drive boss on another arm and rods for rod wrenching on other arms;

FIG. 25 is an L-wrench with a rod wrench leg and a hexagonal wrench boss on an arm of the L-wrench; and FIG. 26 is an L-wrench with a rod wrench leg and a square wrench boss on an arm of the L-wrench.

DESCRIPTION OF PREFERRED EMBODIMENT

Figure 1:
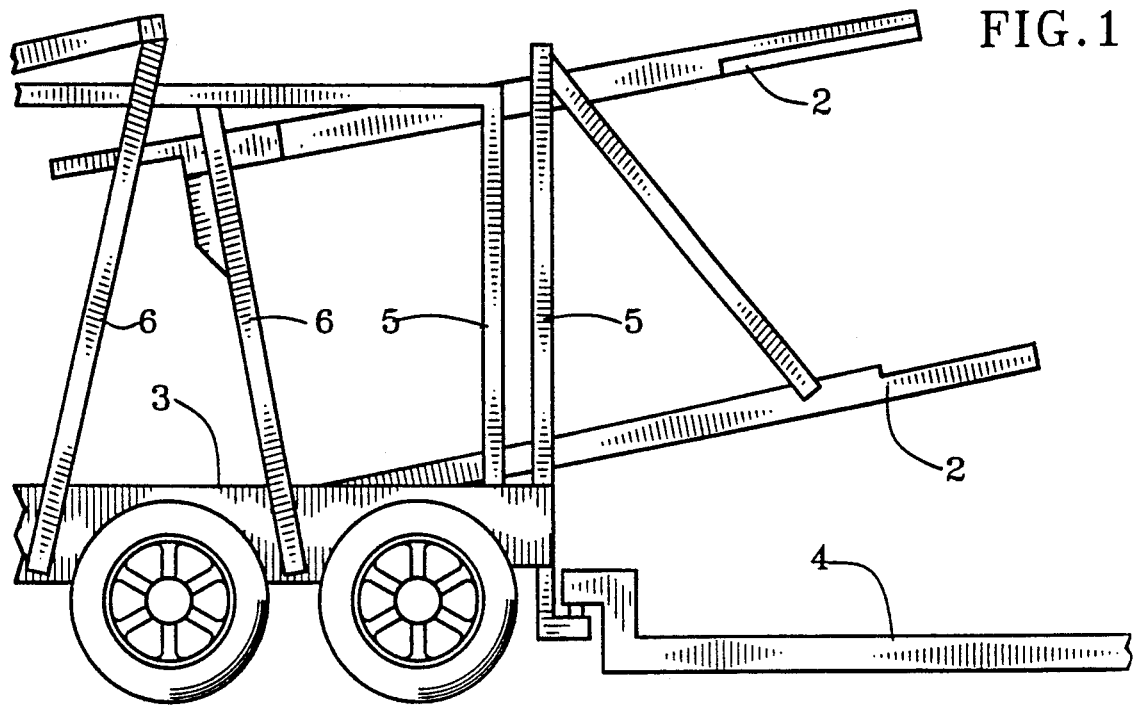
FIG. 1 is a sectional side view of part of a typical car carrier truck and trailer on which this invention used.
Figure 2:
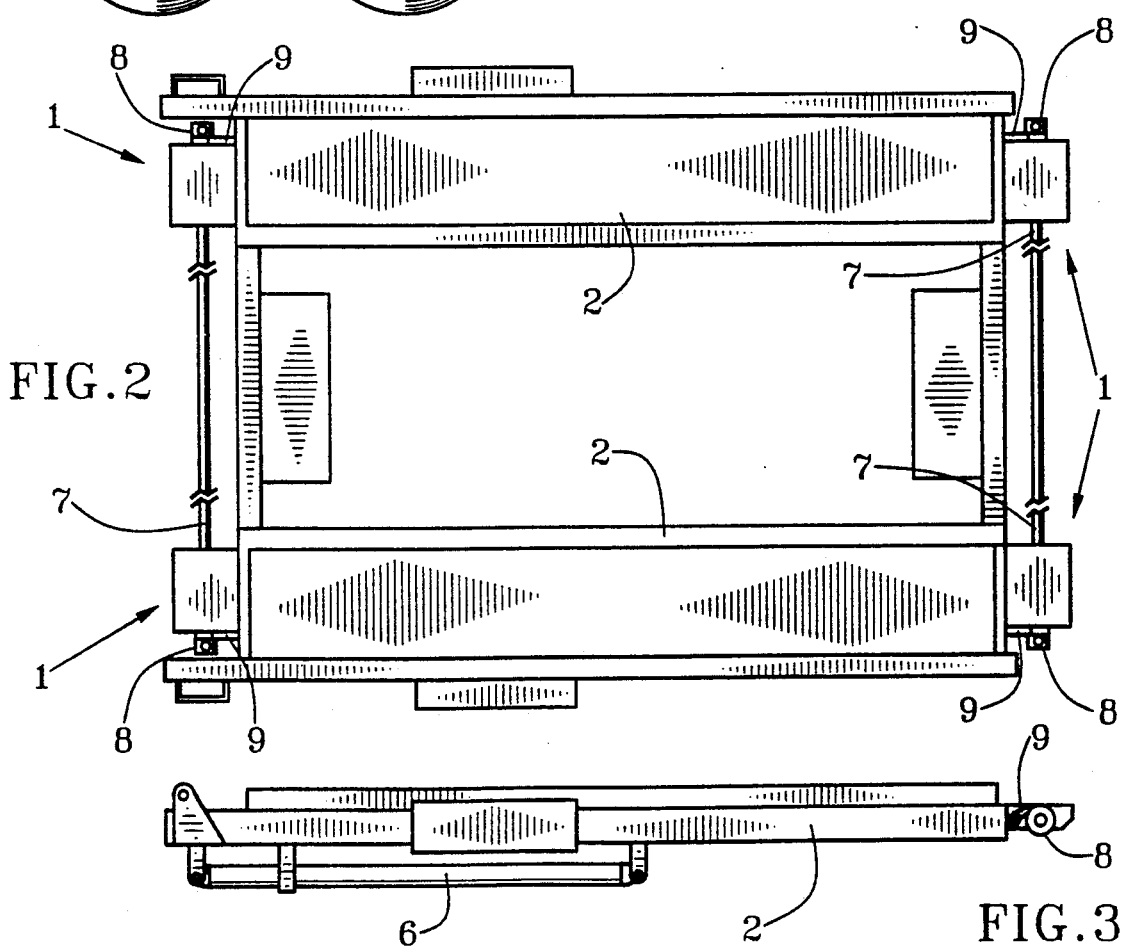
FIG. 2 is a top view of a carrier ramp on which this invention is employed to tie down cars for transportation on car carrier trucks and trailers.
Figure 3:
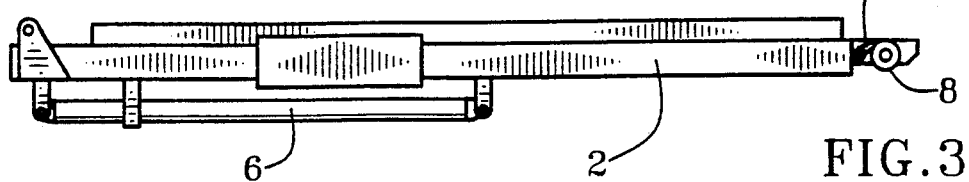
FIG. 3 a side view of the FIG. 2 carrier ramp.

Referring to the drawings wherein like reference numerals designate corresponding parts throughout the several figures, a safety tie-down roller 1 is mounted onto ends of wheel ramps 2 on car carrier trucks 3 and car carrier trailers 4. The wheel ramps 2 are suspended from upright supports 5 and are positional selectively with various hydraulic arms 6. The same as conventional tie-down rollers, the safety tie-down rollers of this invention are used to tie cars to the wheel ramps 2 for transportation in a slanted attitude in order to dovetail ends of cars for maximizing carrying capacity of the car carrier trucks 3 and trailers 4. Also the same as for conventional tie-down rollers, tie-down rods 7 are rotated by a tie-down ratchet gear 8 which is prevented from loosening rotation by a ratchet pawl 9. Cars are tied down with tie-down chain that is hooked onto under structure of the cars at each corner and then wound around the tie-down rods 7 in a winch reel or roller working relationship. The mechanism for this type of tie-down system used universally in the car transportation industry is referred to commonly as a tie-down roller by those who transport cars. The tie-down rods 7 usually are not extended inwardly from the tie-down roller. Some tie-down rods 7, however, are extended all of the way across to opposite side tie-down rollers 1. Differences of the safety tie-down roller 1 are in how it is constructed and operated to enhance safety against cars falling off or being damaged in transit.

Figure 4:
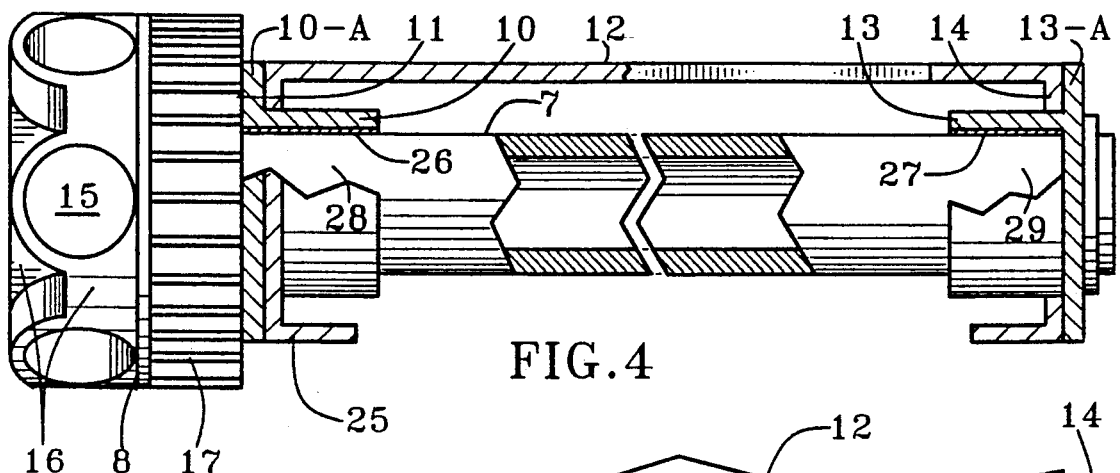
FIG. 4 is a cutaway end view of this invention of a safety tie-down roller mounted on a wheel ramp.
Figure 5:
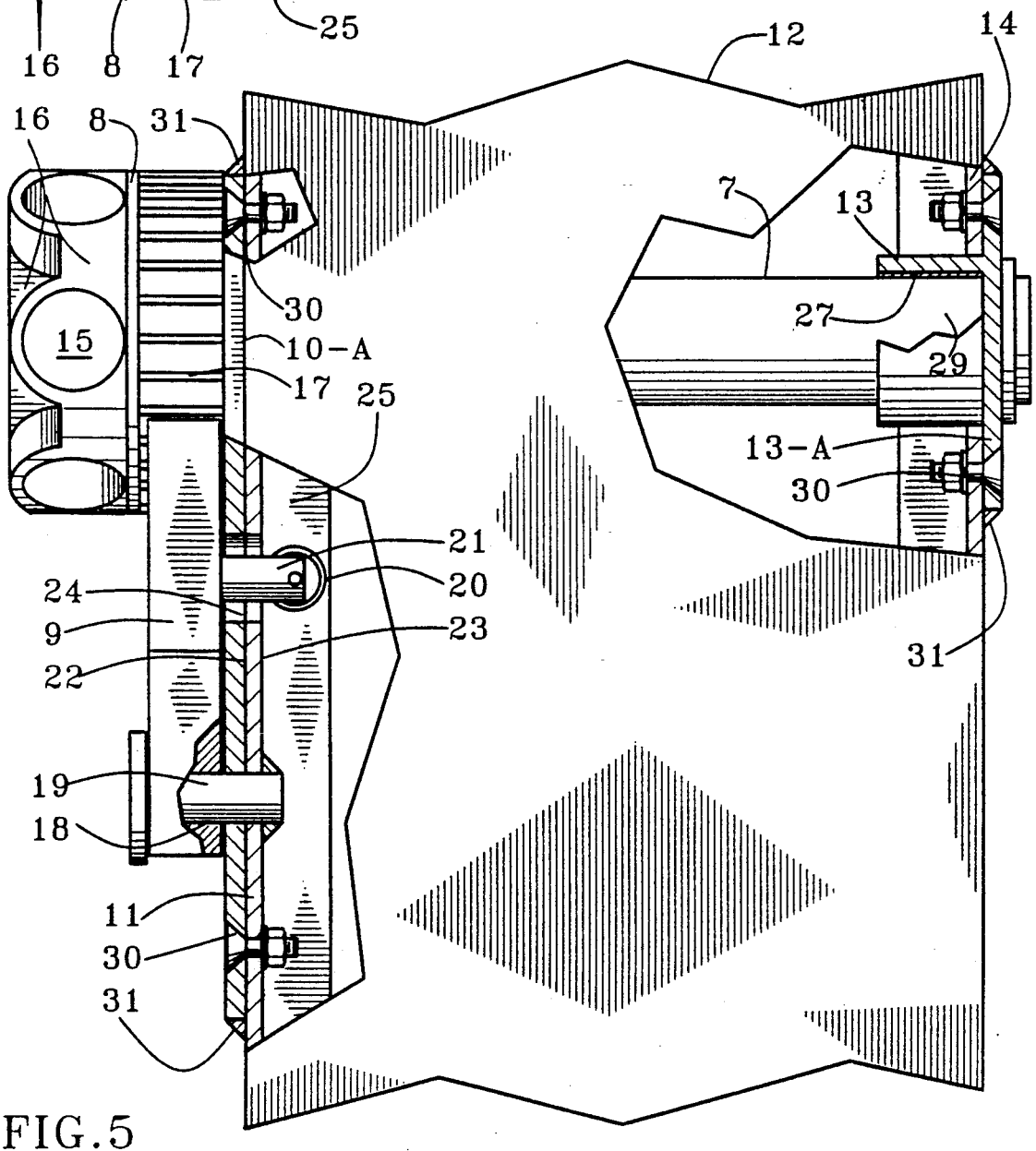
FIG. 5 is a cutaway top view of this invention mounted on a wheel ramp.

Referring to FIGS. 4 and 5, the tie-down rod 7 is extended from the tie-down ratchet gear 8 through a proximal bearing 10 having a proximal attachment flange 10-A at a proximal underwall 11 of a wheel ramp channel 12 and through a distal bearing 13 having a distal attachment flange 13-A at a distal underwall 14 of inverted shallow wheel ramp channel 12. Flanges 10-A and 13-A can be sized, shaped and extended variously for attachment to respective underwalls 11 and 14. Conventionally, the tie-down ratchet gear 8 is provided with bar wrench apertures 15 in a wrench sleeve 16 at a proximal side of ratchet teeth 17. A ratchet pawl 9 having a pawl bearing 18 is attached to the proximal underwall 11 with pawl axle 19 on which the pawl 9 is pivotal. Pawl 9 is pressured into ratchet engagement with ratchet teeth 17 by resilience of pawl spring 20 in contracting relationship to pawl spring arm 21. Pawl spring arm 21 is extended from a proximal side 22 of proximal underwall 11 to a distal side 23 of proximal underwall 11 through pawl spring orifice 24. The pawl spring 20 can be attached to a channel angle plate 25 or other extension from proximal underwall 11.

It is positioning of the pawl spring 20 at a distal side of the underwall 11 of the wheel ramp channel 12 that provides the first fundamental factor of safety to this safety tie-down roller 1. For over five decades since tie-down rollers were introduced, advantages of a pawl spring at a distal side of a proximal underwall 11 have not been known or used. A pawl spring at a proximal side 22 of the proximal underwall 11 is known to have been tried without success because it broke off easily and quickly in the dynamic working conditions at the proximal side 22 of the proximal underwall 11. If full significance of pawl springs had been known previously, a way might have been found to make them successful and economical. But neither occurred.

The function of a ratchet pawl 18 is to prevent unwinding of tie-down chain that is wound around tie-down rod 7. In conventional practice, only tightness of the tie-down chain acts on the ratchet pawl 18 to cause the pawl 18 to remain in effective ratchet relationship to ratchet gear 8. This is self-defeating and too often unreliable, however, because tightness of the tie-down chain can be lost by mere settling in and untwisting of tie-down chain. Even slight loosening of the tie-down chain can cause the pawl 18 to rub, fret, pound and wear against ratchet teeth 17 and shorten the safe use life of tie-down rollers. Road grit, particularly in wet, freezing and sandy desert conditions, speeds fretting wear of pawls that become loose when the tie-down chain loosens slightly. Assuring that there are no twists or potential settling in conditions of tie-down chain on as many as fifty-two tie-down rods 7 per car carrier consumes considerable labor. It is tedious, slow and annoying work that is avoided to the fullest extent possible by car carrier personnel because of the nature of conventional tie-down rollers. Assuring that there is no hazardous wear of bearings or other worn components that could break in transit is difficult to determine and also very objectionable to workers as well as avoidable for cost reasons by owners and managers of car carrier vehicles.

As a result of these and other factors, it is the object of this invention to provide an entire safety tie-down roller 1 that will not only function safely with a ratchet pawl 9 held in place regardless of chain loosening factors. It will be useable fast and easily by workers in a safe manner. It will also provide against wear that is hazardous to conventional tie-down rollers and difficult to assess.

Proximal bearings 10 and distal bearings 13 wear for approximately the same use condition reasons as ratchet teeth 17 on conventional tie-down rollers. But unlike ratchet teeth 17, a hazardous level of bearing wear is difficult to determine. Loose fitting dry bearings are employed, making it difficult for many users to detect appreciable difference between designed looseness and hazardously worn looseness of conventional bearings 10 and 13. For this reason, safety bearings 10 and 13 are a first fundamental for this safety tie-down roller 1 in addition to the safety provided by a pawl spring 20 positioned at a distal side 23 of the proximal underwall 11.

Proximal bearing surface 26 and distal bearing surface 27 can be constructed of a harder and more wear resistant material than proximal end 28 and distal end 29 of tie-down rod 7. Wear resistance of the ends 28 and 29 of tie-down rod 7, therefore, is made sacrificial to bearing surfaces 26 and 27. When this sacrificial wear condition is achieved with hardened steels instead of super alloys or super alloy coatings, it is critical that welding attachment of bearing flanges 10-A and 13-A be sufficiently distanced from the bearing surfaces 26 and 27 that welding heat does not degrade their heat treatment temper. If a closer attachment is preferred, then bolt fastening is recommended, even though high bolting capacity is required to provide sufficient reliability of attachment. For this reason, bearing bolts 30 and bearing welding bead 31 both ar illustrated in relationship of bearing flanges 10-A and 13-A to underwalls 11 and 14 respectively, even though only one of these attachment methods is intended to be used.

Too often users make the mistake of welding bearing sleeves for the tie-down rod 7 onto used or remanufactured car carriers with the welding too close to the bearings. Then when the bearings only last two to six months, they wonder why. For replacement bearings for this safety tie-down roller, therefore, it is recommended that bolt on attachment of bearings 10 and 13 be provided as a low cost alternative to welding for some use conditions.

Preferable to hardened steel for bearing surfaces 26 and 27, and for sacrificial wear ends 28 and 29 of tie-down rods 7 are flame spray or plasma coating with super alloy materials. Use of super alloys for entire bearings 10 and 13 or for entire tie-down rods 7 is prohibitively expensive for the materials involved and for their heat treatment. However, coatings with harder surfaces having longer use life in a dry bearing condition than otherwise available are relatively inexpensive. Relatively inexpensive metal can be used for the flanges 10-A and 13-A and bearing sleeve 10 and 13 host material to offset cost of coating. Overall and in the long run after accounting for longer use life, costs of coating inexpensive metals are less than costs for heat treated metal bearings that are either welded or bolted onto underwalls 11 and 14.

Super alloys, so designated by the American Society for Metals, are those composed primarily of cobalt, nickel, chrome and molybdenum in addition to iron. High resistance of super alloys and of super alloy coating to heat makes it possible to weld the host metals to which they are coated onto underwalls 11 and 14 without distorting or degrading the bearing surfaces 26 and 27. Their critical use condition characteristic, however, is resistance to wear without lubricant in the presence of road dust and particles. They also can wear against each other without galling. Further, some can be slightly softer than others to provide sacrificial wear to harder surfaces. This allows a rod 7 to wear the relatively little that occurs instead of the bearings 10 and 13. It compensates for a higher surface area of the rods 7 that are worn due to rotation against a smaller area of one side of a bearing surface. It also allows for ease of replacement of rods 7 for wear rather than changing weld on bearings 10 and 13.

Coating with the equivalent of super alloys has become sufficiently inexpensive and the flame spray or plasma coating equipment also sufficiently inexpensive that either are a viable alternative to hardened steel bearings 10 and 13 in combination with hardened steel rods 7. Some of the coatings can be used in as applied form without machining or grinding. The low tolerances for appropriately loose fitting dry bearings make possible a high degree of automation for coating surfaces. There are competitive suppliers of coating equipment and coating materials with reliable coating information readily available. Labor for their operation is not excessively high or hard to train. For manufacturers and rebuilders of car carrier vehicles and their components using this safety tie-down roller, the coating embodiment of this invention is recommended.

Reference is made to FIGS. 6-9. A conventional ratchet pawl 9 can be used in conjunction with a conventional tie-down ratchet gear 8 and a spring 20 such as shown in FIG. 4. When a spring is employed, however, a conventional mini handle 32 is inadequate for overcoming resistance of the spring by hand. A tool is necessary and workers generally don't like to have more than a single tool for turning the ratchet gear 8. Consequently, the mini handle 32 can be lengthened into a long pawl handle 33 as illustrated in FIG. 7. Alternatively as illustrated in FIG. 8, a separate handle 34 can be attached by welding or other means to a conventional pawl 9 and to a pawl spring arm 21 extendable through spring orifice 24 from the proximal side of the proximal underwall 11 to a spring 20, shown in FIG. 5, at the distal side 23 of the proximal underwall 11. This separate handle is preferred for embodiments of this invention not employing a hexagonal wrench as described later.

For some applications, an elongated pawl handle 35 shown in FIG. 9 is preferable.

Figure 10:
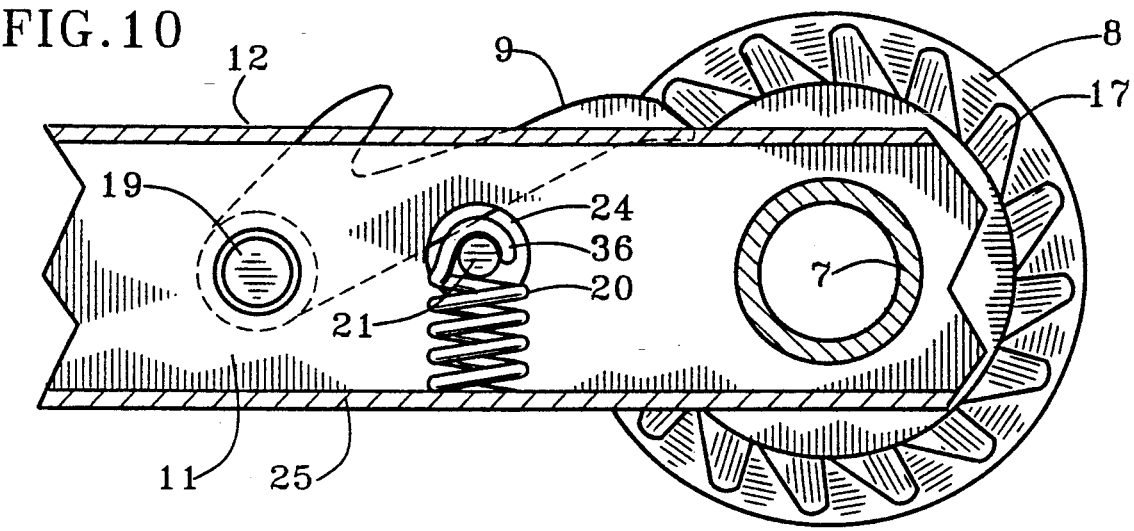
FIG. 10 is a sectional inside view of this invention having a contraction pawl spring positioned inside of a wheel ramp channel.

Reference is made now to FIGS. 10-13 for more detailed description of pawl spring embodiments of this invention. In FIG. 10, a contraction spring 20 is attachable to a channel angle plate 25 or other appendage from the distal side 23 of the proximal underwall 11. It has a spring loop 36 extended over pawl spring arm 21. Pawl axle 19 is rigidly attached to proximal underwall 11.

Figure 11:
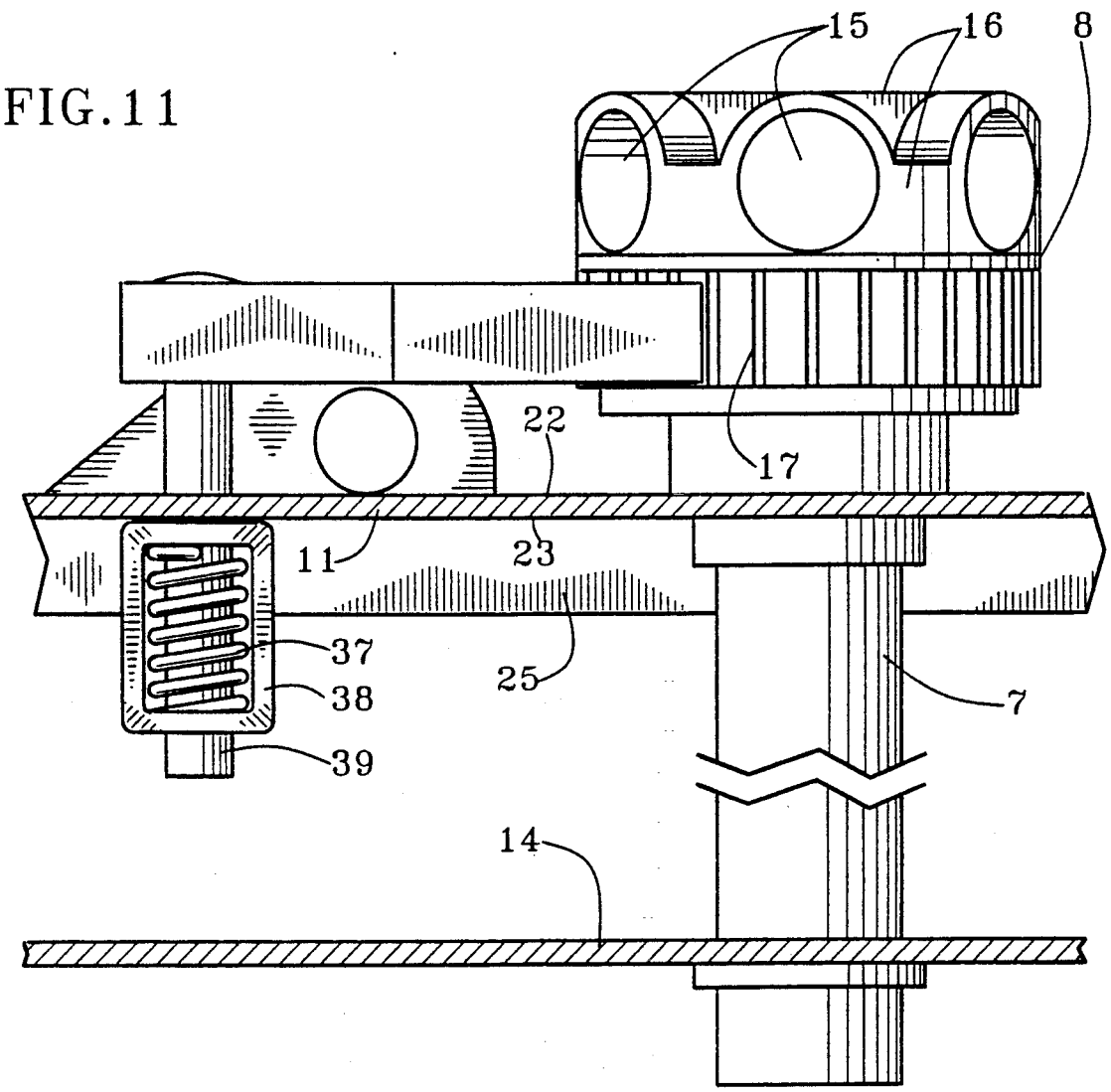
FIG. 11 is a sectional top cutaway view of this invention having a coil spring in torsional spring relationship to a pawl axle.

In FIG. 11, a torsion coil spring 37 is anchored to a spring housing 38 which is attached to the proximal underwall 11. Resilience pressure of torsion coil spring 37 is directed against pawl shaft 39 which is in pivotal contact with proximal underwall 11 and ends of spring housing 38. Pawl 9 is rigidly attached to pawl shaft 39 such that rotational resilient pressure of torsion coil spring 37 causes pawl 9 to engage ratchet teeth 17 on tie-down ratchet gear 8.

Figure 12:
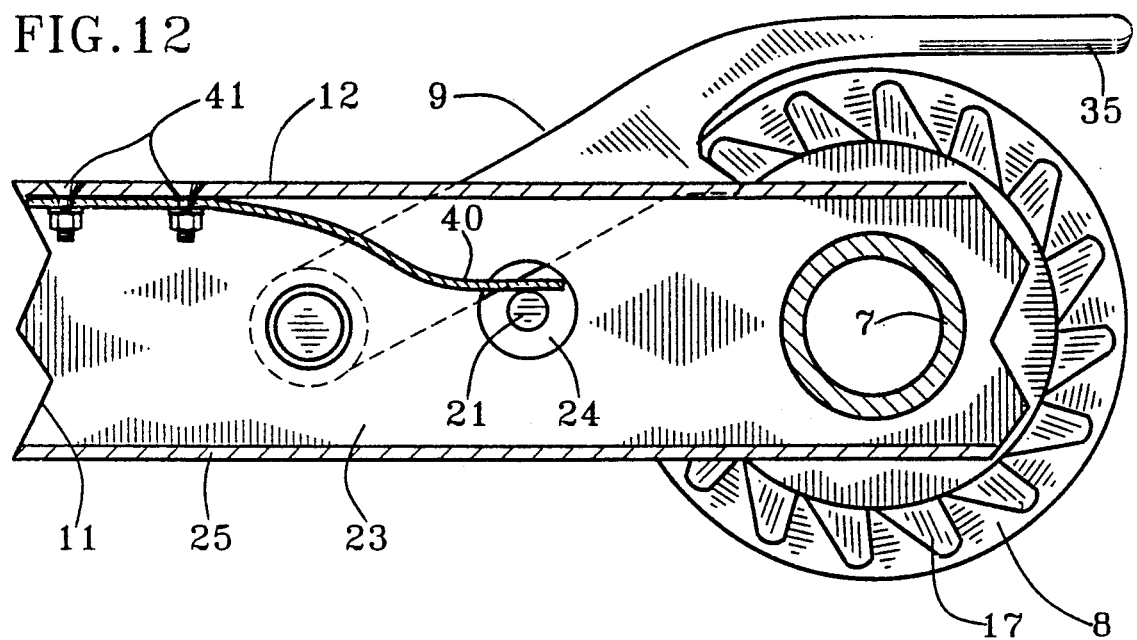
FIG. 12 is an inside sectional view of this invention having a leaf spring form of a ratchet spring.

In FIG. 12, a pawl leaf spring 40 is attachable to wheel ramp channel 12, preferably with flathead bolts 41. A leaf spring is particularly durable, reliable and inexpensive for use at this distal side 23 of the proximal underwall 11. Resilience of leaf spring 40 is directed against pawl spring arm 21 which is extended through spring orifice 24 from pawl 9 from which an optional elongated pawl handle 35 can be extended over the ratchet teeth 17 on tie-down ratchet gear 8. This causes pawl 9 to engage ratchet teeth 17 in ratchet relationship and allows disengagement of the pawl 9 with handle 35 for reverse rotation of tie-down ratchet gear 8 for unwinding tie-down chain on tie-down rod 7.

Figure 13:
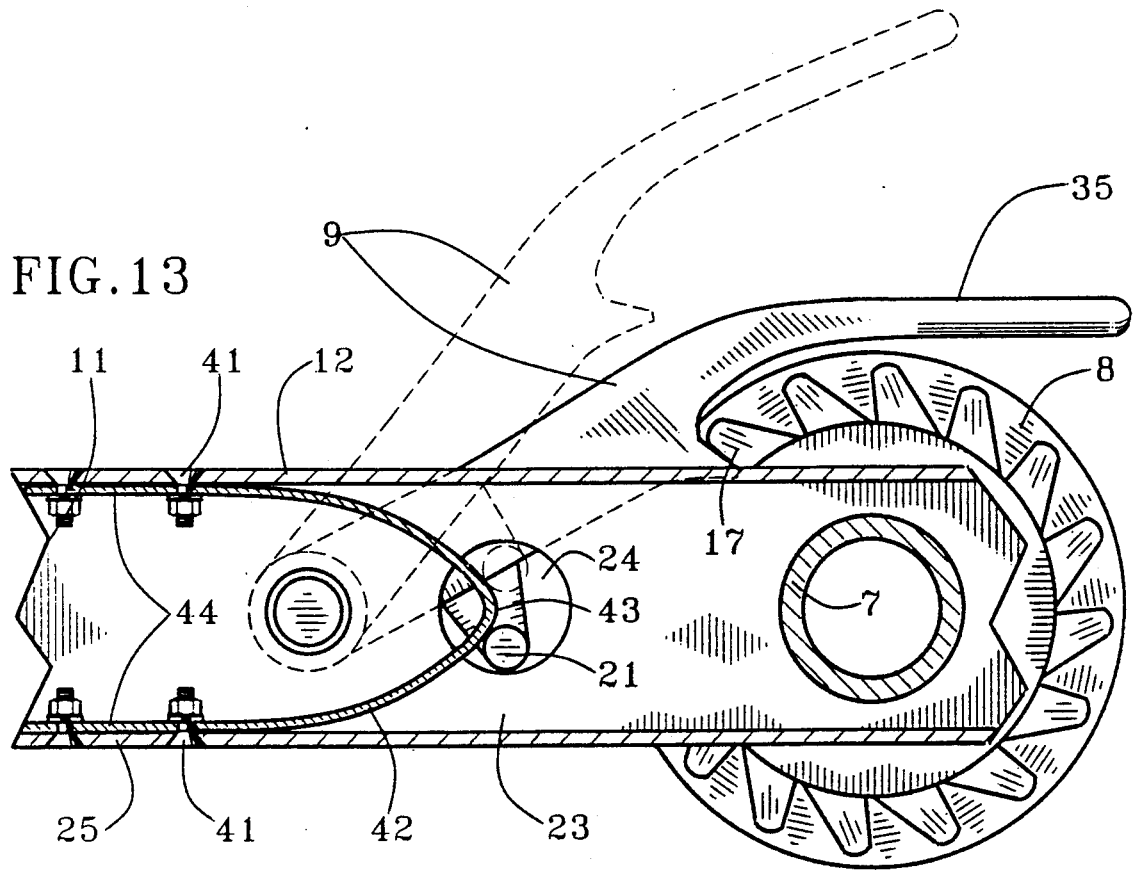
FIG. 13 is an inside sectional view of this invention having a two-way leaf spring with snap shut and snap open resilience of the ratchet pawl.

A two-way snap spring 42, shown in FIG. 13, can be employed to snap pawl 9 in and out of engagement with ratchet teeth 17 on tie-down ratchet gear 8. This allows fast turning of tie-down ratchet gear 8 for untwisting and straightening out tie-down chain on tie-down rod 7 to avoid hazardous loosening of the tie-down chain from settling in of twisted tie-down chains. The pawl need not be hand held in a disengaged position while rotating the tie-down rod 7 to assure proper condition of the tie-down chain. This two-way snap spring 42 is comprised of a U-shaped leaf spring with a selectively curved base point 43 being depressible by paw spring arm 21 when the pawl 9 is raised or lowered over the curved base point 43. Beveled sides of the curved base point 43 then pressure the pawl spring arm 21 in which ever direction the pawl spring ar 21 is positioned by manipulating handle 35 to snap engage or to snap disengage pawl 9 with ratchet teeth 17. Edges of pawl spring orifice 24 prevent excessive travel of pawl 9 away from ratchet teeth 17, making it conveniently accessible and operable at all times. Legs 44 of the U-shaped two-way snap spring 42 are attachable preferably with flathead bolts 41 to wheel ramp channel 12 and channel angle plate 25 or to appendages from wheel ramp channel 12. A roller sleeve can be provided on pawl spring arm 21 to avoid friction resistance from sliding contact with curved base point 43.

Figure 14:
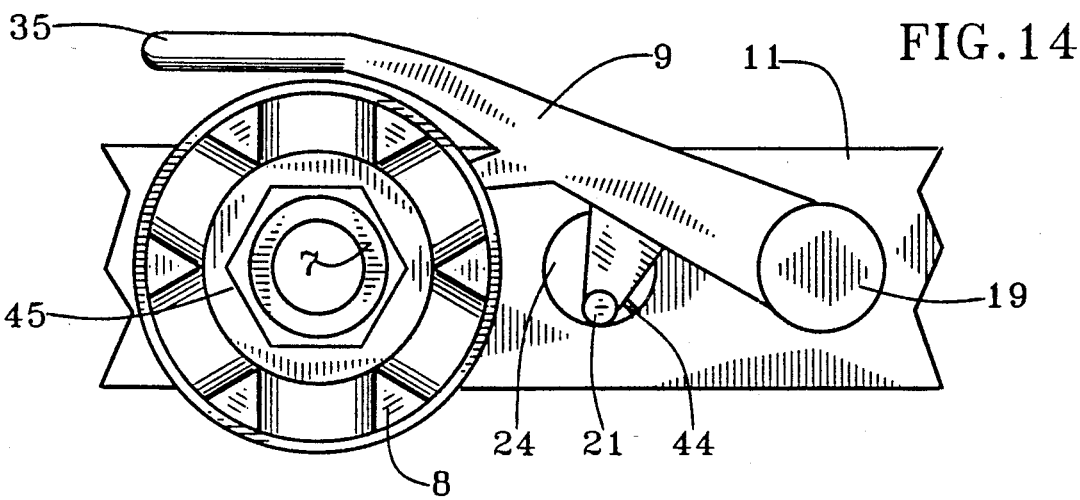
FIG. 14 is a sectional side view of this invention with a two-way spring and a hexagonal wrench socket in addition to conventional rod wrench operation for quick unrolling to remove twists and bends from tie-down chain and for quick rewinding and tie-down rolling of the safety tie-down roller.
Figure 15:
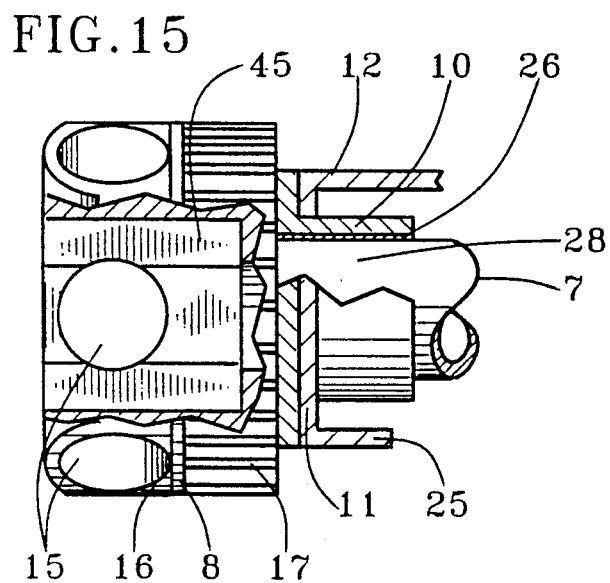
FIG. 15 is a sectional end view of the FIG. 14 illustration.

Reference is made now to FIGS. 14-26 to describe means for quick, easy and controllable rotating of ratchet gear 8 in order to straighten out and safely attach tie-down chain on tie-down rod 7 to cars on wheel ramps 2. In FIGS. 14 and 15, there is a relatively large hexagonal wrench orifice 45 in an inside periphery of wrench sleeve 16. This hexagonal wrench orifice 45 is particularly large in order to provide sufficient structural integrity for wrench operation in the type of hardened steel that is economical for and yet adequate for construction of tie-down ratchet gear 8. Although hardened, the grade of steel adequate for wrenching with bar wrenches in bar wrench apertures 15 is not adequate for conventionally smaller hexagonal or square wrench boss apertures. They require tool steel metals having higher tensile strength and greater hardness. Largeness of this hexagonal wrench orifice 45 also accommodates access to tie down rod 7 for attachment of tie down ratchet gear 8 by welding, heat fitting, spline or other attachment means.

Most significant functionally is that a wrench rod can be employed in bar wrench apertures 15 as an alternative to a hexagonal wrench or wrench adapter fittable into hexagonal wrench orifice 45. This is highly important because users are accustomed to using the bar wrench and because structural upright supports 5, illustrated in FIG. 1, often prevent axial access with hexagonal or square wrench bosses. Particularly at aft ends of car carrier trucks and at sections of some structures of car carrier trailers, a plurality of upright supports 5 and hydraulic arms 6 prevent axial wrench access. However, workers can learn quickly to appreciate the ease and advantages of axial wrench access made possible with this invention and appropriate carrier modifications can be made where necessary. In the interim, a tie-down ratchet gear 8 with both hexagonal wrench orifice 45 and bar wrench apertures 15 can serve as a change over adaptation embodiment of this invention.

Figure 16:
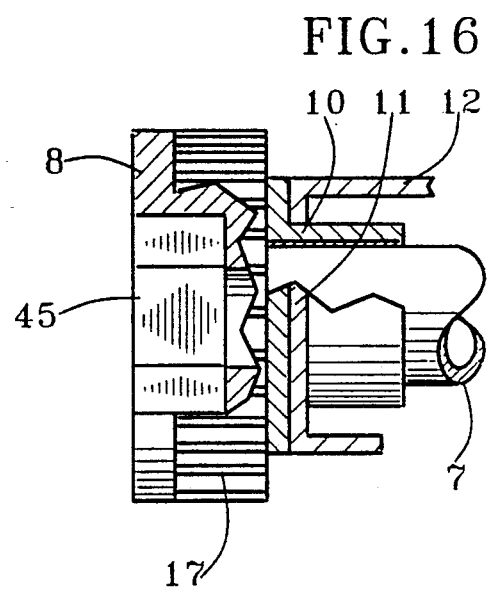
FIG. 16 is a sectional cutaway end view of a ratchet gear with a wrench socket for quick operation of this safety tie-down roller in place of conventional rod wrench apertures.
Figure 17:
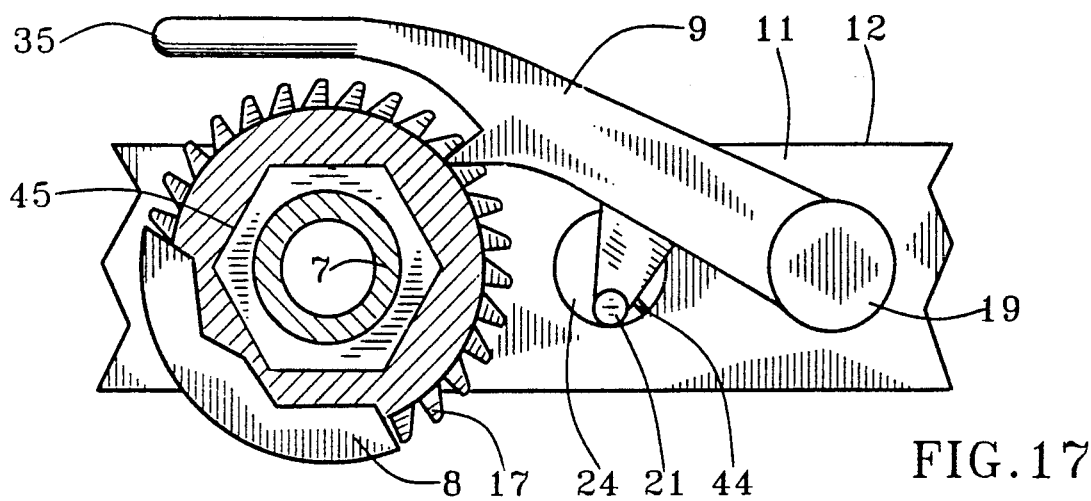
FIG. 17 is a sectional cutaway side view of the FIG. 16 illustration showing also a pawl handle and a portion of a two-way snap spring.

In FIGS. 16 and 17, there is the same large hexagonal wrench orifice 45 but it is in a tie-down ratchet gear 8 without the wrench sleeve 16 and the bar wrench orifices 15. The width of tie-down ratchet gear 8 ma be increased slightly as illustrated to add material for adequate depth of the hexagonal wrench orifice 45. This embodiment is for a more advanced stage of adaptation by car carrier workers and builders to the advantages of this invention.

A coincidental advantage of pawl springs made possible in car carrier use conditions by this invention is shorter and more numerous ratchet teeth 17 for greater tie-down accuracy. Shortness of ratchet teeth is made possible by spring pressure rather than dependence on chain tightness to maintain pawl contact. This condition is emphasized by the much larger ratchet teeth in FIGS. 10, 12 and 13 than in FIGS. 17-19. Also, there is less need to slant front faces of ratchet teeth 17 as shown in FIGS. 10, 12 and 13 for similar reasons related to ratchet technology. The front faces of the ratchet teeth 17 can more safely be perpendicular as in conventional practice and in recommended practice with this invention.

FIG. 18 features a square wrench orifice 46 in tie-down ratchet gear 8. It can be employed independently of whether or not there are a wrench sleeve 16 and bar wrench orifices 15. However, square wrench orifices as small as one-half inch or three quarters of an inch to a side are not recommended unless materials for construction are stronger and harder than economical for present tie-down ratchet gears 8.

FIG. 19 teaches an embodiment of this invention with a hexagonal adapter plate 47 having a square wrench adapter orifice 48 in its center. The hexagonal adapter plate 47 can be made of typically hard tool steel. This allows use of a one-half inch or three quarter inch square drive on either a ratchet wrench, a cross wrench, a motorized wrench or an L-wrench without distorting or fracturing a tie-down gear 8 made with materials and processes that are less expensive than for tool steel.

The hexagonal adapter plate 47 is shown separately from an end in FIG. 20. In FIG. 21, the hexagonal adapter plate 47 is illustrated from a side with the square wrench adapter orifice 48 in cutaway form.

A hexagonal adapter plate 49 with a hexagonal adapter orifice 50 is illustrated in FIG. 22. Its advantages are similar to adapter plate 47. A main advantage of the square aperture 48, however, is use directly from a conventional extension rod or ratchet wrench. Smaller access orifices in carrier structural members are possible, therefore, when necessary.

FIG. 23 illustrates a square wrench orifice 51 built into a tie-down ratchet gear 8 having a wrench sleeve 16. This embodiment also depends on greater strength and hardness of material than is economical generally for ratchet gears 8. However, it is feasible for those who desire a combination of gear types with particularly high grade metal.

Use of a conventional ratchet wrench with embodiments of this invention not having rod wrench apertures 15 and sleeve 16 does not require significantly more clearance at ends of ratchet gears 8 than for conventional bar wrenches. Thus, circumferential access with bar wrenches in contrast to axial or end access with boss drive wrenches is not a factor with ratchet wrenches. However, ratchet wrenches are not as fast and convenient as cross wrenches as provided by this invention. In addition, all ratchet gear 8 positions can be made accessible with a cross wrench as taught by this invention.

Coating of ratchet teeth 17 and wrench orifices 45, 46, 48, 51 or other surfaces where possible impact conditions exist is not recommended. Impacting, piercing or other irregular contact with coating causes it to dislodge. For this reason also, the adapter plates 47 and 49 or wrenches having sufficiently large wrench bosses are provided by this invention.

FIG. 24 teaches a cross wrench 52 having a large hexagonal boss 53 on an end of a cross rod 54 and a square boss 55 on an end of a separate cross rod 56. Round cross rods 57 can be utilized as bar wrenches for bar wrench orifices 15 in wrench sleeves 16 for particular embodiments of this invention. Preferably the cross rods 57 are relatively longer than cross rods 54 and 56 for most applications.

FIG. 25 teaches an L-wrench 58 having a large hexagonal boss 53 on an end of an arm 59 and a round bar wrench 60 on an end of leg 61 of the L-wrench 58. In a like manner, FIG. 26 teaches an L-wrench 62 having a square boss 55 on an end of an arm 59 and a round bar wrench 60 on an end of a leg 61.

Wrenches 58 and 62, are transitional wrenches that can be used with either embodiment or stage of transition of this invention. Cross wrench 52, however, is particularly fast and convenient for unrolling tie-down chain to straighten it out and then rolling it up to tie cars down with this safety tie-down roller 1. It can be spun in either direction and rotated with rotational momentum of cross arms for winding and unwinding chain to eliminate hazardous twists. Its square end with a smaller outside periphery can be inserted through smaller access orifices in structural members to reach ratchet gears 8 having adapter plates 47 fixed in them where necessary. In other positions, the larger hexagonal end of the cross wrench 52 can be used without an adapter plate.

The slow operating and extremely long bar wrenches, up to four feet long, now employed will not be necessary. Nor will their use pose a hazard of distorting cars with over tightening tie-down chains. In the past, it was common practice to over tighten by even jumping on the wrenches. The reason for the hazardous over tightening, however, was to force twists out of tie-down chains in order to prevent later settling in and loosening of the tie-down chains. Now this is not necessary with this invention. Instead, the twists and kinks of chains can be eliminated by quickly and easily unrolling them and then rolling them up untwisted. Even with 300 pound workers jumping on wrenches to over tighten chains, loosening hazards still existed. Now tie-down of cars can be much safer, easier, faster and less expensive.

After a period of transition of workers and manufacturers into full utilization of this invention, a torque wrench can be used to establish guidelines of chain tightening pressure for particular cars and types of tie-down components of cars. Workers can become familiar with the more accurate tightening torque that is suitable. This is possible because uncertainties due to chain twisting can be eliminated conveniently and easily rather than arduously. Workers will be inclined to take this easy precaution instead of jumping on bar wrenches and otherwise tightening them with all of their strength.

What is claimed is:

1. A safety tie-down roller having:
   a wheel ramp channel of a generally U-shaped configuration, the wheel ramp channel further having a top surface and a proximal underwall and a distal underwall, each underwall having a proximal side and a distal side;
   a tie-down rod in rotational contact with the proximal underwall and the distal underwall of the wheel ramp channel;
   a pivot axle in rotational contact with the proximal underwall of the wheel ramp channel, the pivot axle having a proximal end and a distal end;
   a tie-down ratchet gear attached to the tie-down rod at the proximal side of the proximal underwall, the tie-down ratchet gear being spaced a select distance from the proximal side of the proximal underwall;

a tie-down ratchet pawl attached for pivotal movement to the proximal end of the pivot axle, the proximal end of the pivot axle being located outwardly from the proximal side of the proximal underwall at a position which allows contact of the tie-down ratchet gear by the tie-down ratchet pawl;

ratchet teeth on the tie-down ratchet gear having ratchet abutment relationship to the tie-down ratchet pawl from a top of the tie-down ratchet gear; p1 a pawl spring positioned at the distal side of the proximal underwall and having resilience in a rotational direction of travel of the tie-down ratchet pawl towards the top of the tie-down ratchet gear;

the pawl spring comprising a coil spring positioned co-axially with the distal end of the pivot axle at a select distance from an outside periphery of the pivot axle at the distal side of the proximal underwall;

a means for transmitting resilient pressure from the pawl spring at the distal side of the proximal underwall to the tie-down ratchet pawl at the proximal end of the pivot axle;

the means for transmitting resilient pressure from the pawl spring to the tie-down ratchet pawl is attachment of one end of the coil spring to the pivot axle of the tie-down ratchet pawl and attachment of an opposite end of the coil spring to an appendage from the wheel ramp channel in rotational resilient relationship between the said appendage and the coil spring;

the ratchet pawl having a select width dimension and being normally positioned on the pivot axle of the tie-down ratchet pawl a select distance outwardly from the proximal side of the proximal underwall, said select distance being of an amount to position the tie-down ratchet pawl to overlie and engage the ratchet teeth of the tie-down ratchet gear; and the select distance between the proximal side of the proximal underwall and the ratchet pawl being at least equal to the select width dimension of the ratchet pawl, means to disengage the ratchet pawl from the ratchet teeth of the tie-down ratchet gear and to place the ratchet pawl in said select distance between the proximal side of the proximal underwall and the tie-down ratchet gear to thereby permit free rotation of the tie-down ratchet gear.

2. A safety tie-down roller as claimed in claim 1 and further comprising:
a pawl handle extended from the tie-down ratchet outward a select distance parallel to the tie-down ratchet pawl.

3. A safety tie-down roller as claimed in claim 1 and further comprising:
a pawl handle extended from the tie-down ratchet pawl to a select position above the ratchet teeth.

4. A safety tie-down roller as claimed in claim 1 and further comprising:
a square wrench socket in a proximal side of the tie-down ratchet gear.

5. A safety tie-down roller as claimed in claim 1 and further comprising:
a hexagonal wrench socket in a proximal side of the tie-down ratchet gear.

6. A safety tie-down roller as claimed in claim 5 and further comprising:
a wrench adapter plate having a hexagonal periphery fittable in the hexagonal rocket socket; and
a square wrench socket in a center of the wrench adapter plate.

7. A safety tie-down roller as claimed in claim 1 and further comprising:
a wrench sleeve extended from a proximal side of the tie-down ratchet gear;
wrench rod apertures in the wrench sleeve; and
a square wrench socket in an inside circumferential wall of the wrench sleeve.

8. A safety tie-down roller as claimed in claim 1 and further comprising:
a wrench sleeve extended from a proximal side of the tie-down ratchet gear;
wrench rod apertures in the wrench sleeve; and
a hexagonal wrench socket in an inside circumferential wall of the wrench sleeve.

9. A safety tie-down roller as claimed in claim 8 and further comprising:
a wrench adapter plate having a hexagonal periphery fittable in the hexagonal rocket socket; and
a square wrench socket in a center of the wrench adapter plate.

10. A safety tie-down roller as claimed in claim 1 and further comprising:
a proximal bearing sleeve having a bearing flange attachable to the proximal underwall of the wheel ramp channel; and
a non-lubricated solid bearing surface on an inside periphery of the proximal bearing sleeve;
a proximal end of the tie-down rod being in rotational contact with the non-lubricated surface of the proximal bearing sleeve.

11. A safety tie-down roller as claimed in claim 10 and further comprising:
a distal bearing sleeve having a bearing flange attachable to the distal underwall of the wheel ramp channel; and
a non-lubricated solid bearing surface on an inside periphery of the distal bearing sleeve;
a distal end of the tie-down rod being in rotational contact with the non-lubricated solid bearing surface of the distal bearing sleeve.

12. A safety tie-down roller as claimed in claim 1 and further comprising:
a distal bearing sleeve having a bearing flange attachable to the distal underwall of the wheel ramp channel; and
a non-lubricated solid bearing surface on an inside periphery of the distal bearing sleeve;
a distal end of the tie-down rod being in rotational contact with the non-lubricated surface of the distal bearing sleeve.

13. A safety tie-down roller as claimed in claim 1 and further comprising:
a non-lubricated solid bearing surface on an inside periphery of a proximal bearing sleeve attachable to the proximal underwall of the wheel ramp channel; and
a non-lubricated solid bearing surface on an outside periphery of a proximal end of the tie-down rod in sacrificial hardness relationship of rotational contact with the non-lubricated solid bearing surface on the inside periphery of the proximal bearing sleeve.

14. A safety tie-down roller as claimed in claim 13 and further comprising:

a non-lubricated solid bearing surface on an inside periphery of a distal bearing sleeve attachable to the distal underwall of the wheel ramp channel and;

a non-lubricated solid bearing surface on an outside periphery of the distal end of the tie-down rod in sacrificial hardness relationship of rotational contact with the non-lubricated solid bearing surface on the inside periphery of the distal bearing sleeve.

15. A safety tie-down roller as claimed in claim 1 and further comprising:

a non-lubricated solid bearing surface on an inside periphery of a distal bearing sleeve attachable to the distal underwall of the wheel ramp channel and;

a non-lubricated solid bearing surface on an outside periphery of the distal end of the tie-down rod in sacrificial hardness relationship of rotational contact with the non-lubricated solid bearing surface on the inside periphery of the distal bearing sleeve.

* * * * *